United States Patent Office 2,810,469
Patented Oct. 22, 1957

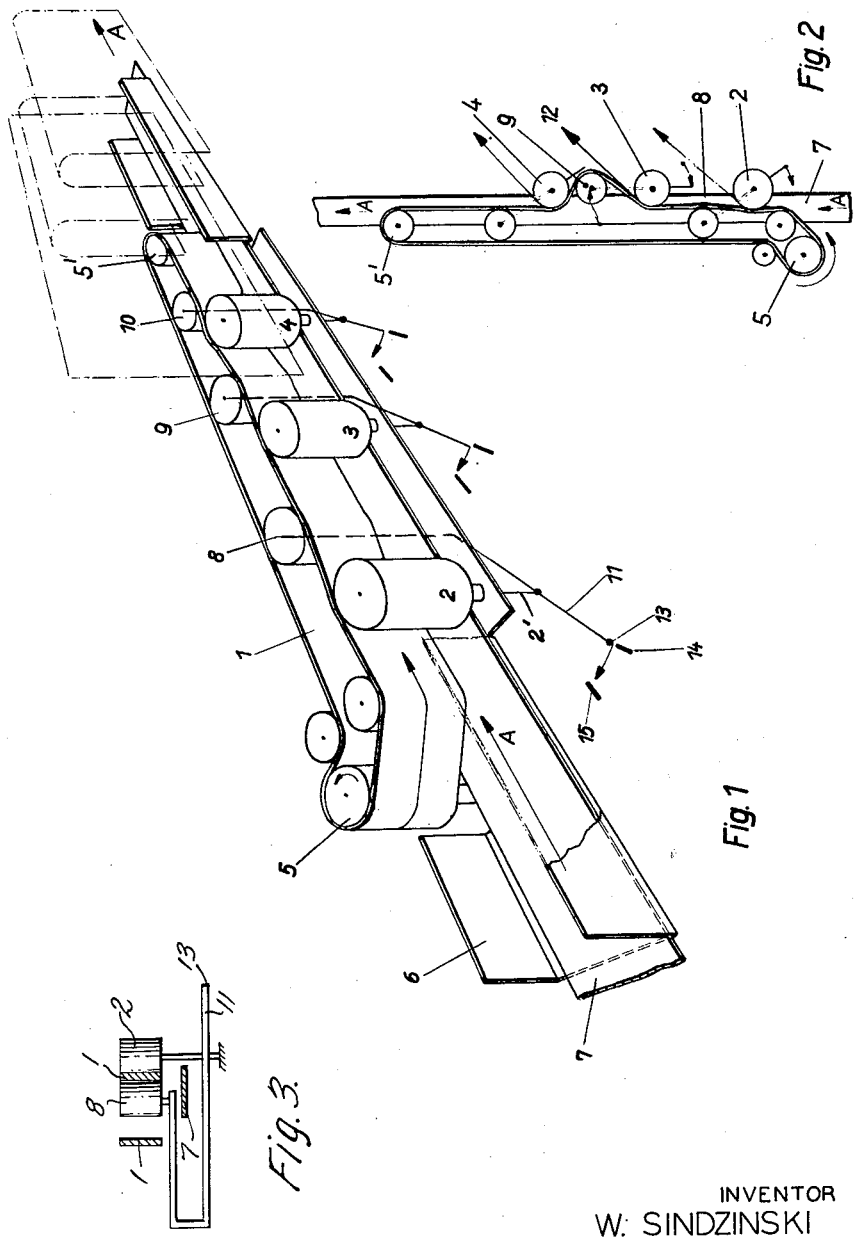

2,810,469

UNLOADER FOR EDGE-WISE CONVEYOR SYSTEM

Willy Sindzinski, Berlin, Germany, assignor to International Standard Electric Corporation, New York, N. Y., a corporation of Delaware Application October 21, 1953, Serial No. 387,385

Claims priority, application Germany October 22, 1952

4 Claims. (Cl. 198—185)

This invention relates to edge-wise conveyor systems of the kind which are employed for the conveyance of flat dispatch articles, such as cards and letters. By means of such systems it is possible to convey the items in question to predetermined receiving points. For the purpose thereof it is known to arrange switches along the conveying path, by means of which the dispatch articles are led out of the main direction. The practical employment of these types of switches, however, has shown that the speed of the dispatch articles is slowed down at the point of re-direction because the conveying force of the conveyor belt cannot be sufficiently effective in the direction of the operated switch. The braking effect will be progressively stronger, the greater the re-direction angle of the switch is in relation to the original conveying direction, and may even lead to a complete standstill of the dispatch articles.

The latter case, in which the articles to be conveyed are taken out of the main direction at a very steep re-direction angle, will occur e. g. if several launching points, arranged closely behind each other, such as branched-off channels are provided in the course of the conveyor belt.

The present invention therefore likewise relates to an edge-wise conveyor system in which switches are arranged along the conveying path for changing the direction of the articles to be conveyed, and has as one object the elimination of the aforementioned difficulties. In accordance with one feature of the invention means for changing the direction of conveyance comprises an endless tape or belt, arranged vertically in relation to the main conveyor belt and rotating in the main direction, the said endless tape passing between the swivel-mounted rollers and counter supports whereby the dispatch article to be re-directed is brought into the new direction by being seized between the tape and the counter support.

According to a further feature of the invention, rollers are employed as counter supports. Such an arrangement is particularly suitable when multiple switches are provided since a plurality of swivel-mounted rollers and a corresponding number of counter supports may be associated with a single rotating endless belt. In this case the re-directing points may be arranged closely adjacent each other.

The invention will be particularly described with reference to a preferred embodiment represented in Figs. 1, 2 and 3 of the accompanying drawing, in which:

Fig. 1 shows the switch means in a perspective view,
Fig. 2 shows the same switch means in a plan view; and
Fig. 3 is an end view of the conveyor system looking in the direction of the arrow A.

An endless belt 1 is arranged above the main conveyor belt 7. This endless belt 1 is arranged vertically in relation to the conveyor belt 7 and rotates in the main direction, the direction of the rotating belt 7 being denoted by an arrow A. The belt 1 is intended to serve for a plurality of launching points. The rotation of belt 1 is effected via the rollers 5 and 5', the roller 5 serving as the driving roller. The belt 1 is made of an elastic material. The driving means for the roller 5 are of the conventional type, e. g., a driving motor or a belt, such as for example the return belt of the main conveyor belt 7.

Along the stretch or throw of the belt 1 there are provided rollers 8, 9, 10, which are swivel-mounted, and on the outside of the belt there are mounted counter supports arranged at certain distances from the rollers 8, 9, 10 in a staggered arrangement, and comprising in the embodiment shown, the rollers 2, 3, 4. If a particular roller 8 is swivelled out of its normal position, then this roller will press the adjacent portion of the belt 1 outwards towards the counter support 2, so that the dispatch article arriving from the lefthand side on the conveyor belt 7, will be led around the counter support roller 2, thus leaving the original direction of conveyance. It is obvious that the roller 8 has to be swivelled out of its normal position for achieving this launching effect and it is of special advantage if the axis 2' of the outside roller 2 is used as a turning point for the slewable roller 8 (Fig. 3). For this purpose a lever shown schematically at 11 is provided and which is turned e. g. around the axis 2' of the roller 2, one end of such lever carrying the slewable roller 8, and the other end 13 of which is used for turning this lever 11. The swivel motion from point 14 to point 15 is performed either by means of an electromagnet, or else manually. The resetting of the lever into the normal position, viz. into the position 14, may likewise be carried out by means of an electromagent or else manually. However, in the example shown a means for freeing the lever will be sufficient, since the tension of the rotating belt 1 will automatically effect the resetting of the swivel-mounted roller 8. Furthermore, it is also unimportant in what manner the swivel motion of the rollers such as 8 is carried out. The swivelling of these rollers may be effected for example in a straight direction of movement, as long as the rollers 8, 9, 10 are always capable of reaching the spaces between the outside rollers 2, 3, 4.

The illustrated embodiment shows a multiple switch which is particularly suitable to such cases in which the launching points are arranged closely adjacent to each other. For this type of switch there is required only one single rotating endless belt. On the other hand this type of switch may also be used for one single launching point only. In this case the rollers 3, 4, 9, 10 would not be provided.

Fig. 2 shows the switch means in a plan view, and more particularly with regard to a launching position. The dispatch article indicated at 12 has passed the first switch point in the main direction, denoted by the roller 8, and is just about to leave the original conveying direction, denoted by the arrow A, by means of the roller 9 which is swivelled out, at the second switch point.

If all the slewable rollers 8, 9 and 10 remain in their normal resting position, then the dispatch article will not leave the main direction.

As will be appreciated from the above description of the invention, the dispatch articles are effectively conveyed by means of the switches projecting into the conveying channel, particularly during the re-directing period, which is in contrast to the conventional way of re-directing the items to be conveyed edge-wise. Moreover, during the passage in the main direction the guidance of the dispatch articles will be maintained by the rollers 2, 3, 4 and by the belt 1 and the conveying speed will also not be reduced in this direction.

While I have described above the principles of my invention in connection with specific apparatus, and particular modifications thereof it is to be clearly understood that this description is made only by way of example and not as a limitation on the scope of my invention.

What is claimed is:

1. In an edge-wise conveyor system, means for changing the direction of articles to be conveyed comprising a first endless belt, a second endless belt arranged perpendicular to said first belt, means for driving both of said belts in the same direction of travel, an idler roller mounted on the outside of said second belt, a switch roller mounted on the inside of said second belt and staggered in position with respect to said idler roller in the direction of travel of said belts, and means for selectively urging said switch roller in a direction toward the outside of said second belt thereby to distort said second belt around a portion of the contours of both said rollers, whereby an article having an edge carried by said first belt will be transported around a portion of the contour of said idler roller between said second belt and the surface of said roller to assume a direction of travel at an angle substantially equal to the angle of displacement of said second belt from its normal direction of travel by reason of the outward movement of said switch roller.

2. An edge-wise conveyor system as claimed in claim 1, wherein said second belt is made of elastic material.

3. An edge-wise conveyor system as claimed in claim 1, wherein said switch roller is mounted on a lever pivoted on the axis of said idler roller.

4. An edge-wise conveyor system as claimed in claim 2, further comprising a plurality of idler rollers in alignment and spaced along the path of travel of said belts and a plurality of switch rollers in alignment and spaced along the path of travel of said belts, each switch roller situated intermediate a pair of adjacent idler rollers.

References Cited in the file of this patent

FOREIGN PATENTS 62,299     Denmark _____ May 15, 1944